(12) United States Patent
Stettner

(10) Patent No.: US 6,474,714 B1
(45) Date of Patent: Nov. 5, 2002

(54) CONVERTIBLE CARGO BODY FOR A VEHICLE

(76) Inventor: Ernest R. Stettner, 595 Gillett Rd., Spencerport, NY (US) 14559

( * ) Notice: Subject to any disclaimer, the term of this patent is extended or adjusted under 35 U.S.C. 154(b) by 0 days.

(21) Appl. No.: 09/853,497

(22) Filed: May 11, 2001

(51) Int. Cl.[7] .............................. B60P 1/04; B60P 3/42; B62D 33/077; B62C 1/06
(52) U.S. Cl. .................. 296/26.08; 296/10; 296/26.06; 296/26.11; 280/638; 414/498; 414/469
(58) Field of Search ...................... 296/10, 193, 26.08, 296/26.06, 26.11; 280/638; 414/498, 469

(56) References Cited

U.S. PATENT DOCUMENTS

| | | | | |
|---|---|---|---|---|
| 1,242,035 A | * | 10/1917 | Pierson et al. | 296/26.11 |
| 1,272,620 A | * | 7/1918 | Carlson | 296/26.11 |
| 1,289,997 A | * | 12/1918 | Wyeth | 296/26.11 |
| 1,358,001 A | * | 11/1920 | Kusterer | 296/26.06 |
| 1,363,405 A | * | 12/1920 | Gilmore | 296/26.11 |
| 1,424,222 A | * | 8/1922 | Tuttle | 296/26.11 |
| 1,446,833 A | * | 2/1923 | Carlson | 296/26.11 |
| 1,454,784 A | | 5/1923 | Gilmore | |
| 2,254,437 A | | 9/1941 | Marney | |
| 2,809,046 A | * | 10/1957 | Anderson | 296/26.11 |
| 3,622,026 A | * | 11/1971 | Tornheim | 414/498 |
| 4,057,282 A | | 11/1977 | Kidd | |
| 4,071,274 A | * | 1/1978 | Dalton et al. | 414/498 |
| 4,114,942 A | * | 9/1978 | Greiner | 296/26.11 |
| 4,132,444 A | * | 1/1979 | Beggs | 296/26.11 |
| 4,982,971 A | | 1/1991 | Marin | |
| 5,354,090 A | * | 10/1994 | Grovom | 280/638 |
| D367,463 S | | 2/1996 | Reiland | |
| 5,797,641 A | | 8/1998 | Lincoln | |
| 5,971,459 A | * | 10/1999 | Gauthier | 296/26.08 |
| 6,412,847 B2 | * | 7/2002 | De Gaillard | 296/26.11 |
| 2001/0050490 A1 | * | 12/2001 | De Gaillard | 296/37.6 |

* cited by examiner

Primary Examiner—D. Glenn Dayoan
Assistant Examiner—Hilary Gutman

(57) ABSTRACT

A convertible cargo body for a vehicle for allowing the user to convert cargo boxes to trailers depending upon the type of cargo being carried. The convertible cargo body for a vehicle includes a cargo body support assembly being adapted to be mounted upon a chassis of a vehicle; and also includes a cargo body assembly including a first box member being securely supported upon the cargo body support assembly and also including a second box member being hingedly attached to and removably disposed upon the first box member; and further includes a wheeled trailer assembly for supporting the second box member.

10 Claims, 3 Drawing Sheets

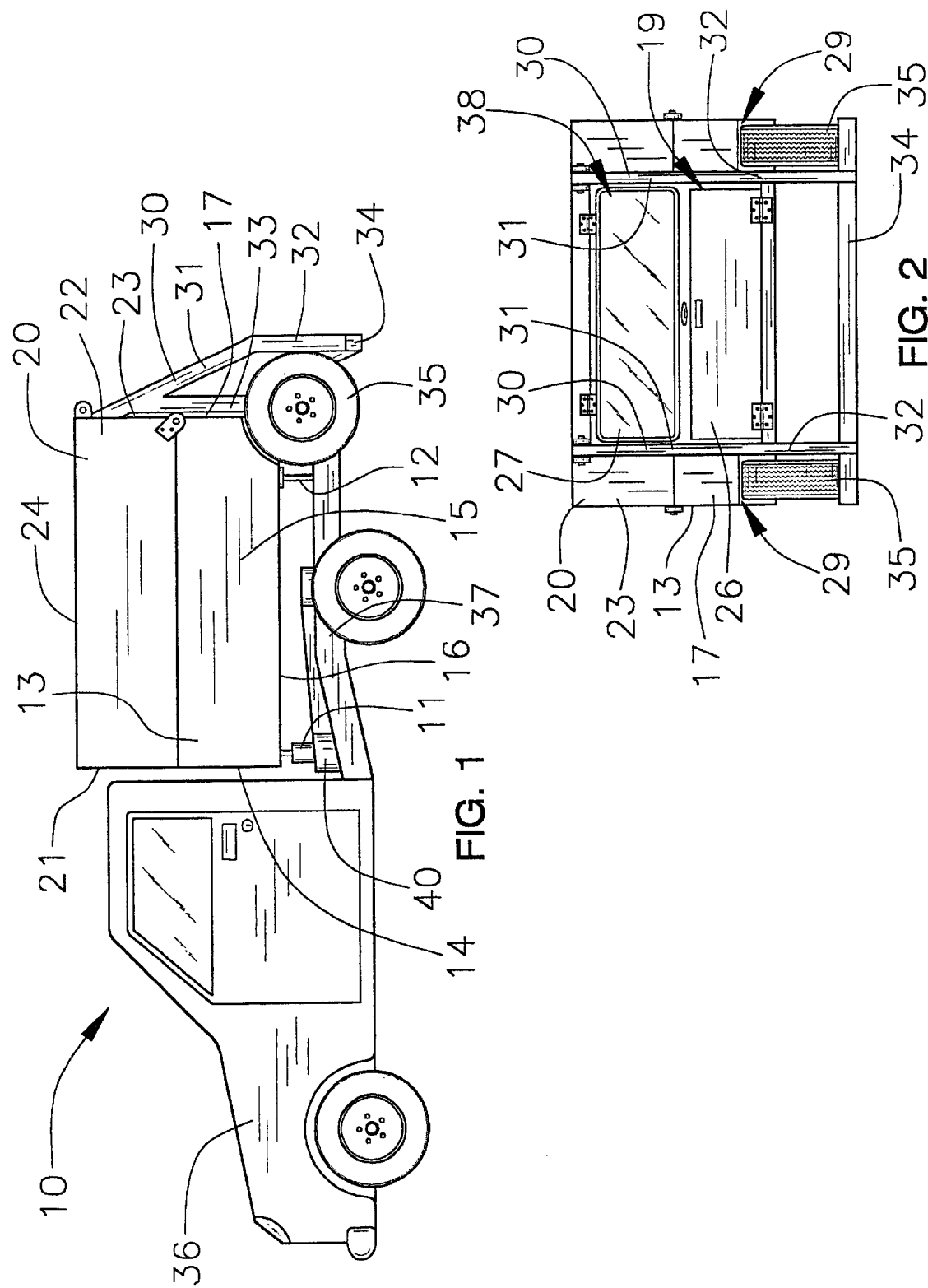

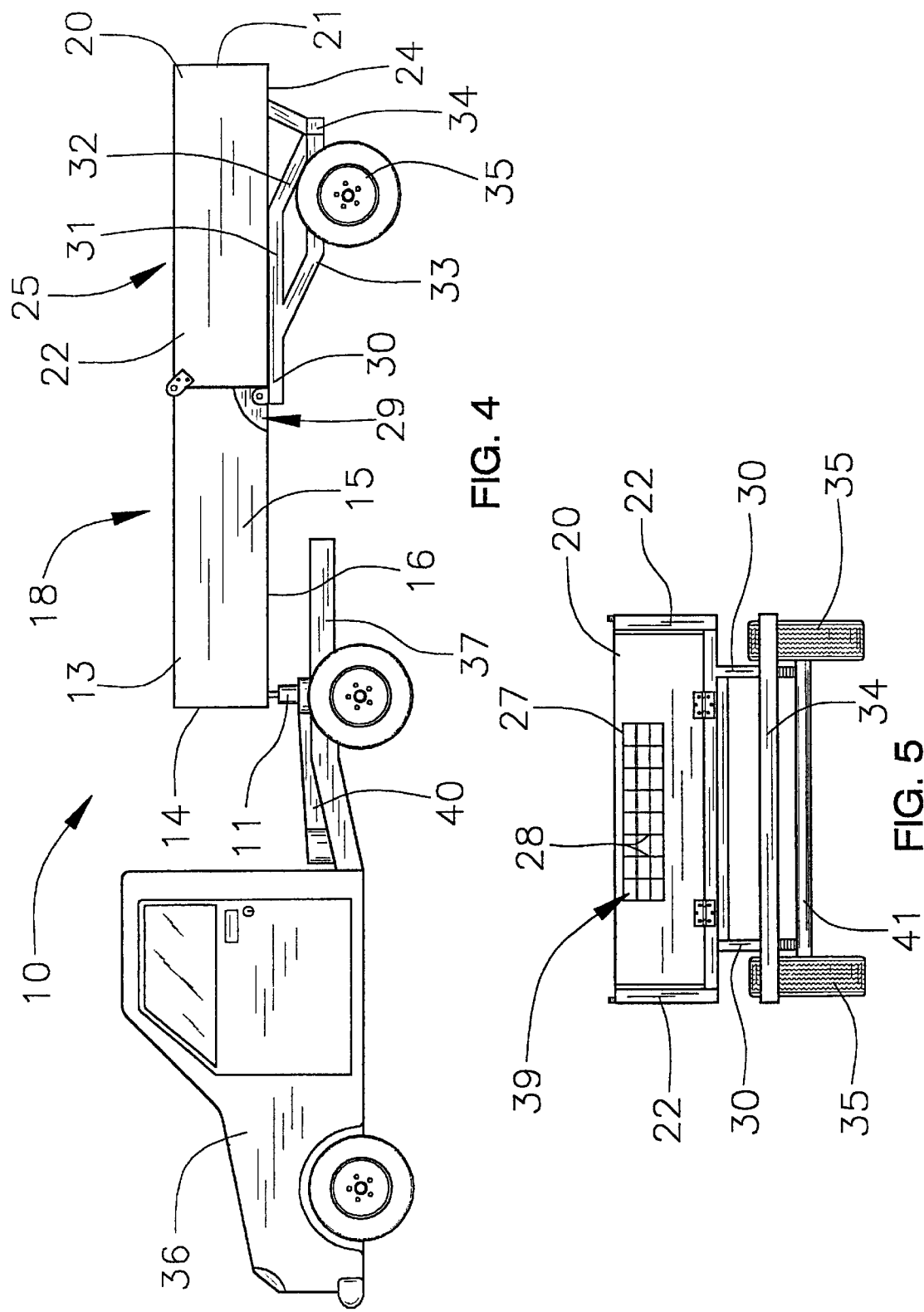

CONVERTIBLE CARGO BODY FOR A VEHICLE

BACKGROUND OF THE INVENTION

1. Field of the Invention

The present invention relates to a cargo body for a vehicle and more particularly pertains to a new convertible cargo body for a vehicle for allowing the user to convert cargo boxes to trailers depending upon the type of cargo being carried.

2. Description of the Prior Art

The use of a cargo body for a vehicle is known in the prior art. More specifically, a cargo body for a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,057,282; 5,797,641; 2,254,437; 4,982,971; 1,454,784; and U.S. Pat. No. Des. 367,463.

While these devices fulfill their respective, particular objectives and requirements, the aforementioned patents do not disclose a new convertible cargo body for a vehicle. The inventive device includes a cargo body support assembly being adapted to be mounted upon a chassis of a vehicle; and also includes a cargo body assembly including a first box member being securely supported upon the cargo body support assembly and also including a second box member being hingedly attached to and removably disposed upon the first box member; and further includes a wheeled trailer assembly for supporting the second box member.

In these respects, the convertible cargo body for a vehicle according to the present invention substantially departs from the conventional concepts and designs of the prior art, and in so doing provides an apparatus primarily developed for the purpose of allowing the user to convert cargo boxes to trailers depending upon the type of cargo being carried.

SUMMARY OF THE INVENTION

In view of the foregoing disadvantages inherent in the known types of cargo body for a vehicle now present in the prior art, the present invention provides a new convertible cargo body for a vehicle construction wherein the same can be utilized for allowing the user to convert cargo boxes to trailers depending upon the type of cargo being carried.

The general purpose of the present invention, which will be described subsequently in greater detail, is to provide a new convertible cargo body for a vehicle which has many of the advantages of the cargo body for a vehicle mentioned heretofore and many novel features that result in a new convertible cargo body for a vehicle which is not anticipated, rendered obvious, suggested, or even implied by any of the prior art cargo body for a vehicle, either alone or in any combination thereof.

To attain this, the present invention generally comprises a cargo body support assembly being adapted to be mounted upon a chassis of a vehicle; and also includes a cargo body assembly including a first box member being securely supported upon the cargo body support assembly and also including a second box member being hingedly attached to and removably disposed upon the first box member; and further includes a wheeled trailer assembly for supporting the second box member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new convertible cargo body for a vehicle which has many of the advantages of the cargo body for a vehicle mentioned heretofore and many novel features that result in a new convertible cargo body for a vehicle which is not anticipated, rendered obvious, suggested, or even implied by any of the prior art cargo body for a vehicle, either alone or in any combination thereof.

It is another object of the present invention to provide a new convertible cargo body for a vehicle which may be easily and efficiently manufactured and marketed.

It is a further object of the present invention to provide a new convertible cargo body for a vehicle which is of a durable and reliable construction.

An even further object of the present invention is to provide a new convertible cargo body for a vehicle which is susceptible of a low cost of manufacture with regard to both materials and labor, and which accordingly is then susceptible of low prices of sale to the consuming public, thereby making such convertible cargo body for a vehicle economically available to the buying public.

Still yet another object of the present invention is to provide a new convertible cargo body for a vehicle which provides in the apparatuses and methods of the prior art some of the advantages thereof, while simultaneously overcoming some of the disadvantages normally associated therewith.

Still another object of the present invention is to provide a new convertible cargo body for a vehicle for allowing the user to convert cargo boxes to trailers depending upon the type of cargo being carried.

Yet another object of the present invention is to provide a new convertible cargo body for a vehicle which includes a cargo body support assembly being adapted to be mounted upon a chassis of a vehicle; and also includes a cargo body assembly including a first box member being securely supported upon the cargo body support assembly and also including a second box member being hingedly attached to and removably disposed upon the first box member; and further includes a wheeled trailer assembly for supporting the second box member.

Still yet another object of the present invention is to provide a new convertible cargo body for a vehicle that is multi-functional for various needs.

Even still another object of the present invention is to provide a new convertible cargo body for a vehicle that is easy and convenient to use and adapt to various needs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a new convertible cargo body for a vehicle according to the present invention.

FIG. 2 is a rear elevational view of the present invention.

FIG. 4 is yet another side elevational view of the present invention shown as trailer.

FIG. 5 is another rear elevational view of the present invention shown as a trailer.

DESCRIPTION OF THE PREFERRED EMBODIMENT

Figure 3:
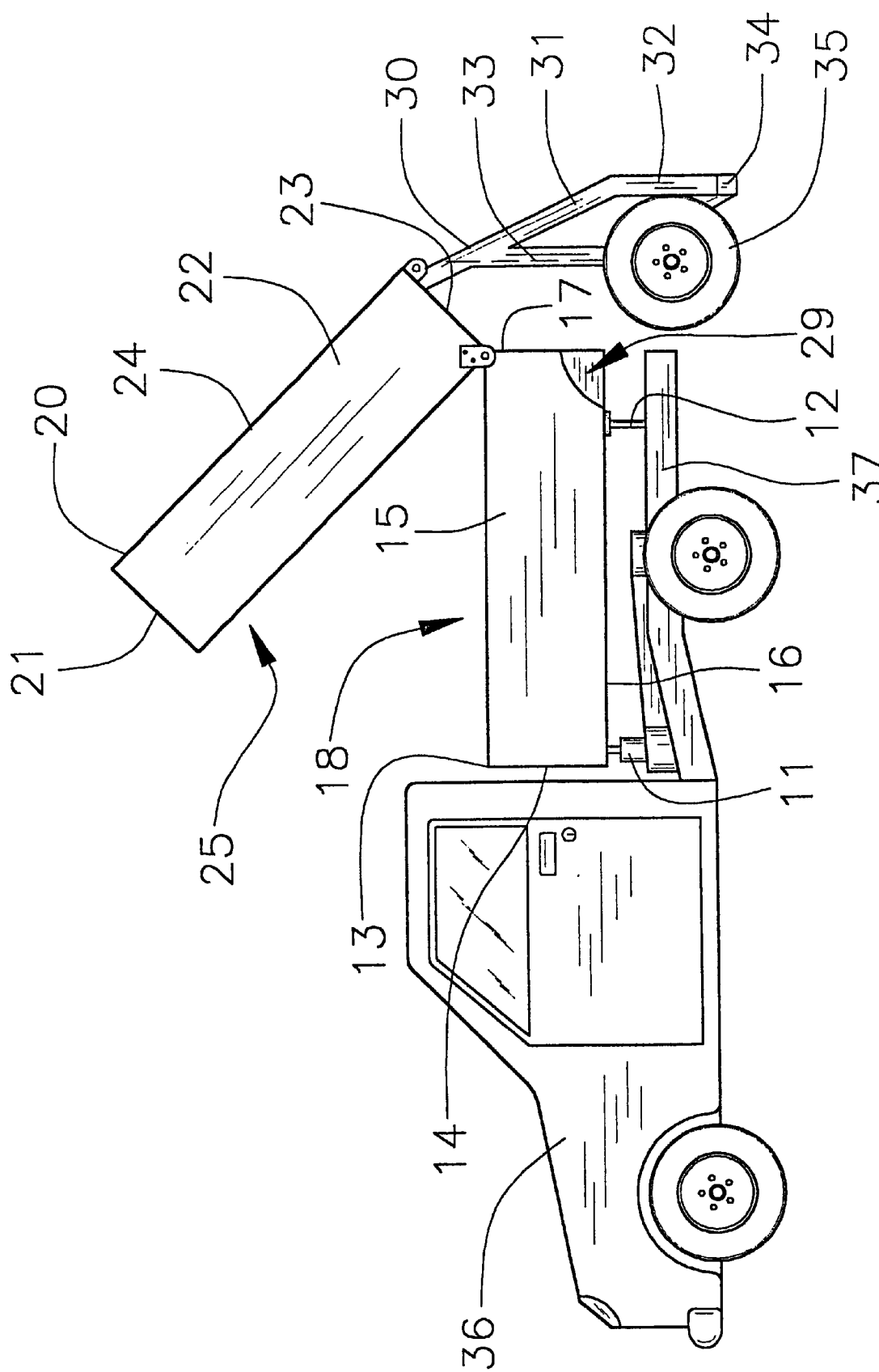
FIG. 3 is another side elevational view of the present invention being converted into a trailer.

With reference now to the drawings, and in particular to FIGS. 1 through 5 thereof, a new convertible cargo body for a vehicle embodying the principles and concepts of the present invention and generally designated by the reference numeral 10 will be described.

As best illustrated in FIGS. 1 through 5, the convertible cargo body for a vehicle 10 generally comprises a cargo body support assembly being adapted to be conventionally mounted upon a chassis 37 of a vehicle 36. The cargo body support assembly includes a fifth wheel member 11 being slidably and pivotally mounted upon a fifth wheel support member 40 which is conventionally mounted upon the chassis 37 of the vehicle 36, and also includes a pedestal member 12 being conventionally mounted upon the chassis 37 of the vehicle 36.

A cargo body assembly includes a first box member 13 being securely and conventionally supported upon the cargo body support assembly and also includes a second box member 20 being hingedly attached to and removably disposed upon the first box member 13. The first box member 13 includes bottom 16, front 14, side 15, and back 17 walls, and an open top 18. The first box member 13 is conventionally supported upon the fifth wheel member 11 and the pedestal member 12 and has an opening 19 through the back wall 17 thereof. The second box member 20 includes a top 24, front 21, side 22, and back walls 23, and an open bottom 25. The second box member is hingedly attached at a bottom of the back wall 23 thereof to a top of the back wall 17 of the first box member 13. The second box member 20 also has a first opening 38 through the back wall 23 and a second opening 39 through the front wall 21. The second box member 20 is also adapted to form a trailer with the second box member 20 being disposed behind and longitudinally aligned with the first box member 13. The second box member 20 is further adapted to form a cargo box with the second box member 20 being disposed upon the first box member 13. The cargo body assembly further includes tailgates being closable over the opening 19 in the back wall 17 of the first box member 13 and hingedly attached to the second box member 20 and being closable over the second opening 39 of the second box member 20, and also includes windows 27 being conventionally disposed over the first and second openings 38, 39 of the second box member 20, and further includes window protector members 28 being conventionally disposed over the windows 27.

A wheeled trailer assembly for supporting the second box member 20 includes a frame 30–34 being hingedly attached to the second box member 20, and also includes wheel members 35 being conventionally mounted to an axle 41 which is conventionally mounted to the frame 30–34. The frame 30–34 includes two elongate box support members 30 each including an elongate main portion 31 having an end which is hingedly attached at a top of the back wall 23 of the second box member 20 and also includes an elongate end portion 32 which is angled relative to the elongate main portion 31, and also includes elongate wheel support members 33 each being conventionally attached to and angled relative to a respective elongate main portion 31 and also being conventionally attached to an end of a respective elongate end portion 32, and further includes a cross member 34 being securely and conventionally attached to the ends of the elongate end portions 32 of the elongate box support members 30. The wheel members 35 and the axle 41 are conventionally mounted to the elongate wheel support members 33. The first box member 13 includes wheel wells 29 being conventionally disposed in corners formed by the back wall 17, side wall 15 and the bottom wall 16. The wheel wells 29 are adapted to receive the wheel members 35 upon the second box member 20 being disposed upon the first box member 13 to form the cargo box.

In use, the user can convert the cargo body either to the cargo box or to the trailer by either leaving the second box member 20 upon the first box member 13 or pivoting the second box member 20 relative to the first box member 13 to form the trailer. Smaller and more compact objects can be carried in the cargo box and longer objects can be carried in the trailer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A convertible cargo body for a vehicle comprising:
   a cargo body support assembly being adapted to be mounted upon a chassis of a vehicle;
   a cargo body assembly including a first box member being securely supported upon said cargo body support assembly and also including a second box member being hingedly attached to and removably disposed upon said first box member; and
   a wheeled trailer assembly for supporting said second box member.

2. A convertible cargo body for a vehicle as described in claim 1, wherein said cargo body support assembly includes a fifth wheel member being slidably and pivotally mounted upon a fifth wheel support which is conventionally mounted upon the chassis of the vehicle, and also includes a pedestal member being mounted upon the chassis of the vehicle.

3. A convertible cargo body for a vehicle as described in claim 2, wherein said first box member includes bottom, front, side, and back walls, and an open top, said first box member being supported upon said fifth wheel member and said pedestal member and having an opening through said back wall thereof.

4. A convertible cargo body for a vehicle as described in claim 3, wherein said second box member includes a top, front, side, and back walls, and an open bottom, said second box member being hingedly attached at a bottom of said back wall thereof to a top of said back wall of said first box member, said second box member also having a first opening through said back wall and a second opening through said front wall, said second box member also being adapted to form a trailer with said second box member being disposed behind and longitudinally aligned with said first box member, said second box member further being adapted to form a cargo box with said second box member being disposed upon said first box member.

5. A convertible cargo body for a vehicle as described in claim 4, wherein said cargo body assembly further includes tailgates being closable over said opening in said back wall of said first box member and also being hingedly attached to said second box member and being closable over said second opening, and also includes windows being disposed over said first and second openings of said second box member, and further includes window protector members being disposed over said windows.

6. A convertible cargo body for a vehicle as described in claim 4, wherein said wheeled trailer assembly includes a frame being hingedly attached to said second box member, and also includes wheel members being mounted to an axle which is mounted to said frame.

7. A convertible cargo body for a vehicle as described in claim 6, wherein said frame includes elongate box support members each including an elongate main portion having an end which is hingedly attached at a top of said back wall of said second box member, and also including an elongate end portion which is angled relative to said elongate main portion, and also includes elongate wheel support members each being attached to and angled relative to a respective said elongate main portion and also being attached to an end of a respective said elongate end portion, and further includes a cross member being securely attached to said ends of said elongate end portions of said elongate box support members.

8. A convertible cargo body for a vehicle as described in claim 7, wherein said wheel members and said axle are mounted to said elongate wheel support members.

9. A convertible cargo body for a vehicle as described in claim 8, wherein said first box member includes wheel wells disposed in corners formed by said back wall, said side walls, and said bottom wall, said wheel wheels being adapted to receive said wheel members upon said second box member being disposed upon said first ox member to form the cargo box.

10. A convertible cargo body for a vehicle comprising:
    a cargo body support assembly being adapted to be mounted upon a chassis of a vehicle, said cargo body support assembly including a fifth wheel member being slidably an d pivotally mounted upon a fifth wheel support which is conventionally mounted upon the chassis of the vehicle, and also including a pedestal member being mounted upon the chassis of the vehicle;
    a cargo body assembly including a first box member being securely supported upon said cargo body support assembly and also including a second box member being hingedly attached to and removably disposed upon said first box member, said first box member including bottom, front, side, and back walls, and an open top, said first box member being supported upon said fifth wheel member and said pedestal member and having an opening through said back wall thereof, said second box member including a top, front, side, and back walls, and an open bottom, said second box member being hingedly attached at a bottom of said back wall thereof to a top of said back wall of said first box member, said second box member also having a first opening through said back wall and a second opening through said front wall, said second box member also being adapted to form a trailer with said second box member being disposed behind and longitudinally aligned with said first box member, said second box member further being adapted to form a cargo box with said second box member being disposed upon said first box member, said cargo body assembly further including tailgates being closable over said opening in said back wall of said first box member and also being hingedly attached to said second box member and being closable over said second opening, and also including windows being disposed over said first and second openings of said second box member, and further including window protector members being disposed over said windows; and
    a wheeled trailer assembly for supporting said second box member, said wheeled trailer assembly including a frame being hingedly attached to said second box member, and also including wheel members and an axle being mounted to said frame, said frame including elongate box support members each including an elongate main portion having end which is hingedly attached at a top of said back wall of said second box member and also including an elongate end portion which is angled relative to said elongate main portion, and also including elongate wheel support members each being attached to and angled relative to a respective said elongate main portion and also being attached to an end of a respective said elongate end portion, and further including a cross member being securely attached to said ends of said elongate end portions of said elongate box support members, said wheel members and said axle being mounted to said elongate wheel support members, said first box member including wheel wells disposed in corners formed by said back wall, said side walls and said bottom wall, said wheel wheels being adapted to receive said wheel members upon said second box member being disposed upon said first box member to form the cargo box.

* * * * *